United States Patent
Verhaeghe

[11] Patent Number: 6,158,773
[45] Date of Patent: Dec. 12, 2000

[54] FRAME FOR A VEHICLE

[75] Inventor: Jan Verhaeghe, Beveren, Belgium

[73] Assignee: Groep Stevens International, nv, Beveren, Belgium

[21] Appl. No.: 09/147,381
[22] PCT Filed: Jun. 10, 1997
[86] PCT No.: PCT/BE97/00068
§ 371 Date: Dec. 14, 1998
§ 102(e) Date: Dec. 14, 1998
[87] PCT Pub. No.: WO97/48589
PCT Pub. Date: Dec. 24, 1997

[30] Foreign Application Priority Data

Jun. 14, 1996 [BE] Belgium .................................. 9600553

[51] Int. Cl.⁷ ............................ B62D 21/04; B60G 11/46
[52] U.S. Cl. .................. 280/787; 280/789; 280/124.163
[58] Field of Search .................................. 280/781, 789, 280/787, 788, 124.157, 124.158, 124.162, 124.163

[56] References Cited

U.S. PATENT DOCUMENTS

| | | | |
|---|---|---|---|
| 4,596,402 | 6/1986 | Raidel | 280/711 |
| 4,718,692 | 1/1988 | Raidel | 280/713 |
| 4,906,021 | 3/1990 | Rowe et al. | 280/789 |
| 5,393,096 | 2/1995 | Pierce et al. | 280/788 |
| 5,476,704 | 12/1995 | Köhler. | |
| 5,649,719 | 7/1997 | Wallace et al. | 280/713 |
| 5,868,418 | 2/1999 | VanDenberg | 280/43.23 |

FOREIGN PATENT DOCUMENTS

| | | |
|---|---|---|
| 0 142 581 | 5/1985 | European Pat. Off. . |
| 2 572 788 | 5/1986 | France . |
| 196 24 267 | 1/1997 | Germany . |
| WO97/48589 | 12/1997 | WIPO . |

OTHER PUBLICATIONS

"Composite Truck Frame Rails Tested", Gerald L. May, Automotive Engineering, vol. 87, No. 11, Nov. 1979, pp. 77–79.

Primary Examiner—Kevin Hurley
Assistant Examiner—Lynda Jasmin
Attorney, Agent, or Firm—Bacon & Thomas, PLLC

[57] ABSTRACT

A frame for a vehicle with at least two longitudinal members (8) and at least one wheel shaft (5) supported on suspension members (6) that are fixed to the longitudinal members (8). The longitudinal members (8) are made of composite material and various parts of the frame are glued together.

14 Claims, 4 Drawing Sheets

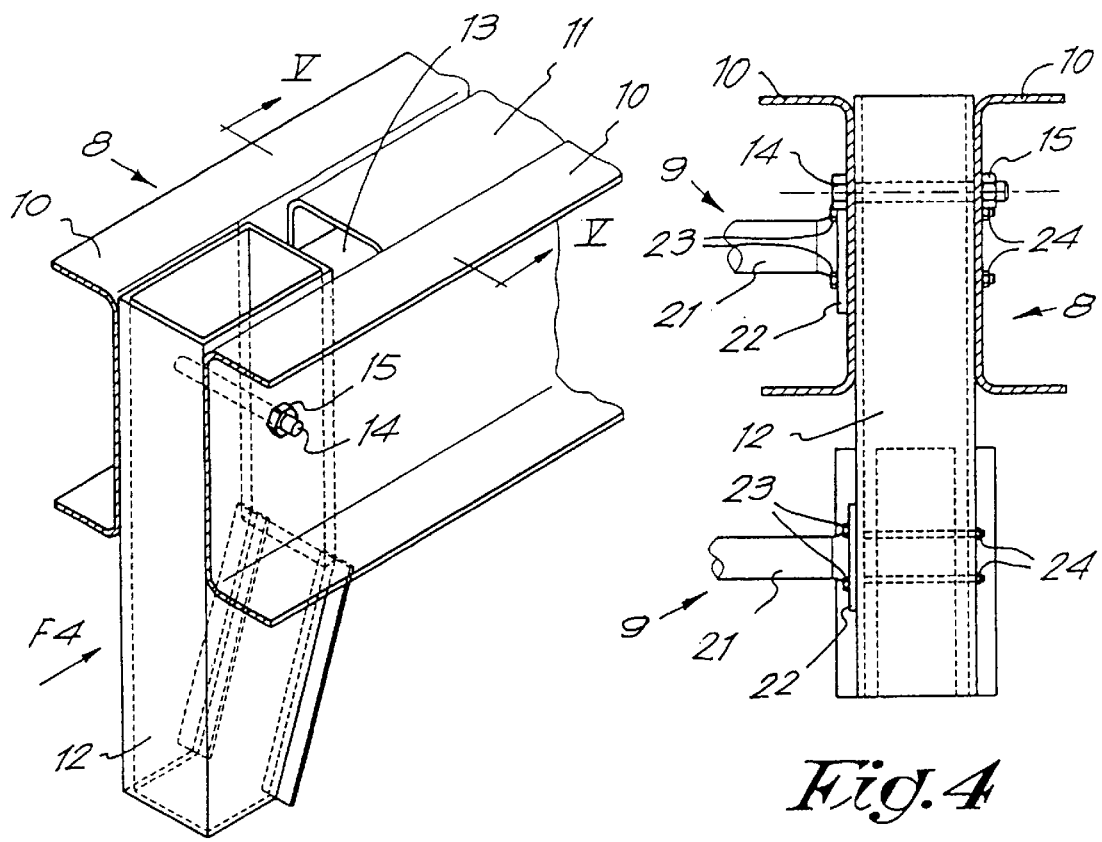
Fig.3
Fig.4
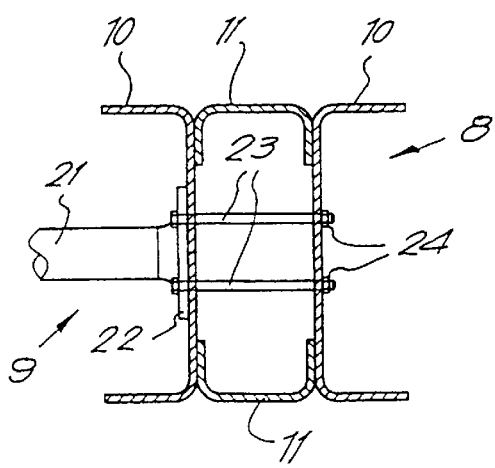
Fig.5
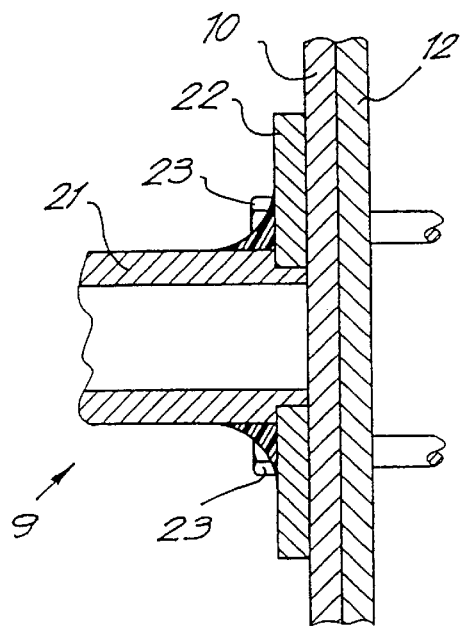
Fig.8

FRAME FOR A VEHICLE

BACKGROUND OF THE INVENTION

1. Field of the Invention

The invention concerns a frame for a vehicle, which frame comprises at least two longitudinal members of composite material, at least one axle supported by suspension members, and a connection device connecting each suspension member to a longitudinal member.

2. Description of the Related Art

The vehicle disclosed concerns a drawn vehicle as well as a self-driving vehicle, both with at least one axle on both ends as with at least one axle on the rear end only.

In particular, the invention concerns, however not exclusively, a trailer with one or more axles on the rear end.

With such frames, the longitudinal members are made of metal, usually steel.

Longitudinal members of steel are relatively heavy, as a result of which also the frame is relatively heavy.

That is why frames with longitudinal members made of aluminum are already used. They are lighter but relatively expensive. In order to offer the same bending strength and torsional strength as steel, aluminum struts must have a larger section.

Recently, frames with longitudinal members of composite material—i.e. synthetic material reinforced with fibres have been experimented.

Such frame is disclosed in the article of GERALD L. MAY: "Composite truck frame rails tested" in AUTOMOTIVE ENGINEERING, vol. 87, no. 11, November 1979, pages 77–79.

SUMMARY OF THE INVENTION

The invention discloses a frame which does not have the above mentioned and other disadvantages of the prior art, and which has a greater strength than that of the prior art, but is nevertheless relatively light in weight and inexpensive.

This aim of the invention is achieved by a connection device comprising a connecting piece (what is called a trestle) which is inserted with its upper end inside a longitudinal member, whereby two standing side walls of this end are glued to parts of the longitudinal member.

Preferably, the longitudinal members are composed of members comprising two base struts, the upper end of the trestle being inserted between said base struts and glued to both base struts.

According to the invention, the aim is also reached in that the longitudinal members are composed of members comprising two base struts with a U-shaped section, which are directed with their cores to one another and which are connected to one another by at least two smaller connecting struts which are glued to the cores of the above-mentioned base struts.

According to another aspect of the invention, the frame comprises at least one cross member which is made of a composite material and which is glued, for example by the intermediary of a flange or by a thickening, to the longitudinal members with its end and comprises a tubular body made by pulwinding or filament winding.

The frame may comprise at its front portion a plate made of a composite material which is glued to the two longitudinal members and which carries the king pin at the bottom for fastening it to a trailer.

BRIEF DESCRIPTION OF THE DRAWINGS

In order to better explain the characteristics of the invention, the following preferred embodiment of a frame according to the invention is described as an example only without being limitative in any way, with reference to the accompanying drawings, in which:

FIG. 3 shows the section according to line 111—111 in FIG. 2 in perspective;

FIG. 4 shows a view according to F4 in FIG. 3;

FIG. 5 shows a section according to line V—V in FIG. 3;

FIG. 8 shows a section according to line VIII—VIIIin FIG. 7;

DETAILED DESCRIPTION OF THE PREFERRED EMBODIMENTS

Figure 1:
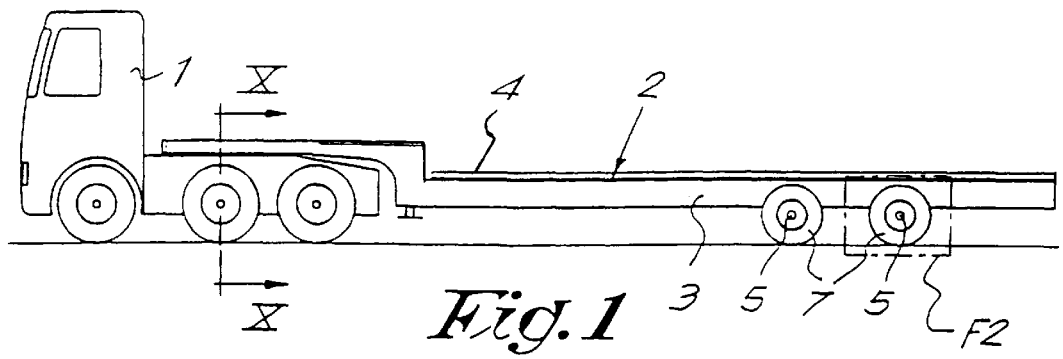
FIG. 1 shows a truck with a trailer according to the invention.

FIG. 1 shows a combination of a truck 1 with a trailer 2, whereby the trailer 2 commonly consists of a frame 3 resting on two wheel sets at the back and upon which is provided a floor 4 or superstructure.

Figure 2:
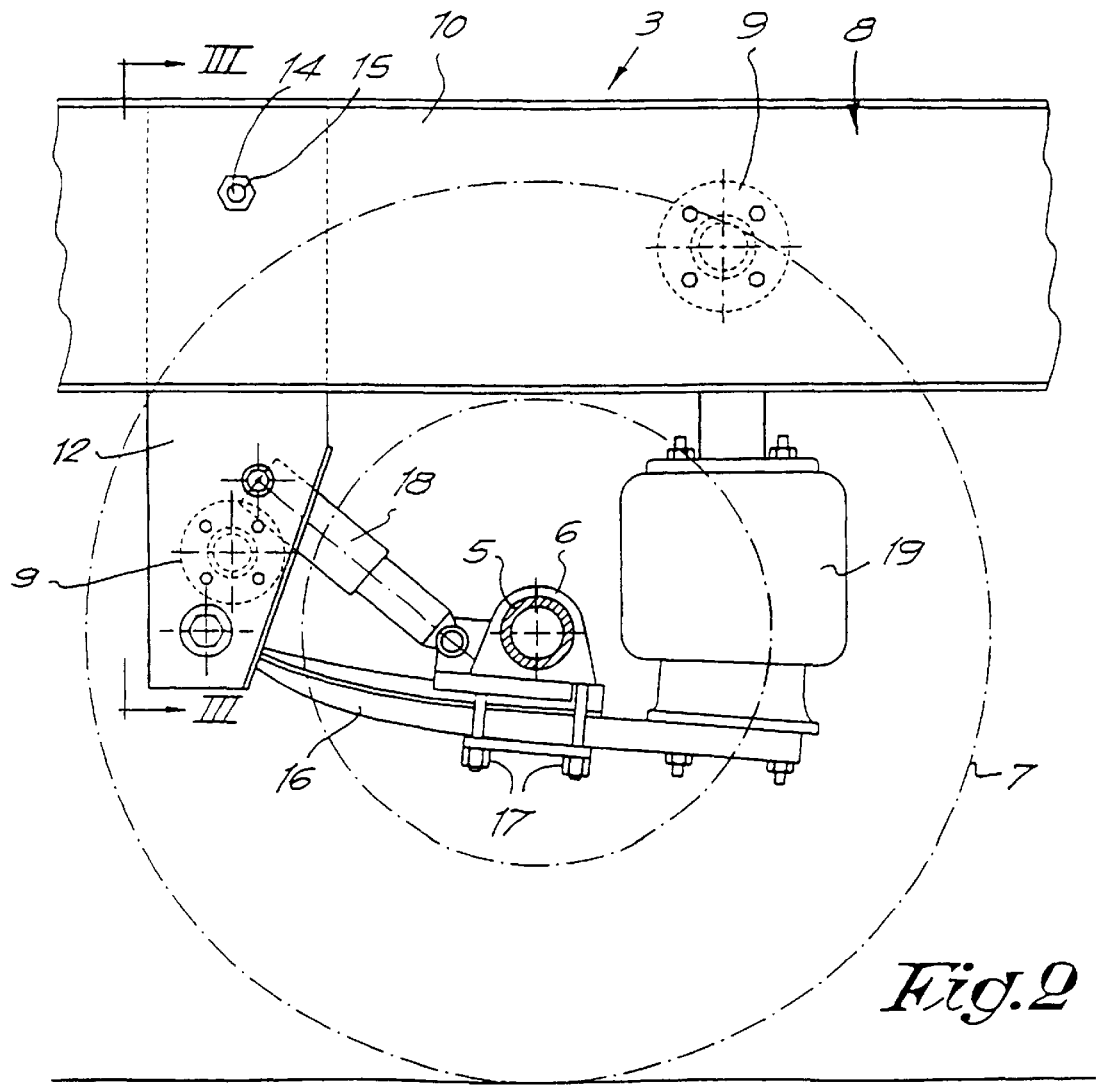
FIG. 2 shows the part which is indicated by F2 in FIG. 1 to a larger scale.

These wheel sets, as is represented in detail in FIG. 2, hereby mainly consist of an axle 5 supported on suspension members 6 which are connected to the frame 3 in a springy manner and wheels 7 fixed on the ends of the axle 5.

The frame 3 mainly consists of two composed longitudinal members 8 and of cross members 9 mounted in between them.

The longitudinal members 8 are composed of two base struts 10 with a U-shaped section and two smaller connecting struts 11 which also have a U-shaped section, whereby both the base struts 10 and the connecting struts 11 are pultruded struts or struts made by pultrusion from composite material. By pultrusion, is meant a method known as such whereby a reinforcement formed of fibres or a tissue is moisturized with synthetic material by immersion or spraying, and whereby the soaked fibres or the soaked tissue are subsequently pulled through a heated extrusion device, after which the synthetic material cures. Composite material is synthetic material reinforced with fibres, such as polyester reinforced with glass fibre. Also other synthetic materials or polymers can be used. Instead of glass fibres, other reinforcement fibres can be used such as carbon fibres, aramid fibres and such.

As is represented in FIGS. 3 and 5, the base struts 10 with their vertically erected cores are directed towards one another, and forming receiving surfaces (for a trestle 12) with a distance between said cores. As a result, the legs of the struts 10 are pointed laterally outward.

The connecting struts 11 are situated with their cores on top of and at the bottom of the base struts 10 respectively, and thus with their legs pointing towards one another.

The legs of these connecting struts 11 are glued to the backsides of the cores of the base struts 10, for example by a two-component glue such as epoxy.

The springy mounting of each suspension member 6 in relation to a longitudinal member 8 is carried out, as is represented in detail in FIG. 2, by a securing element, what is called a trestle 12, which is situated with its top part between the two base struts 10 of the longitudinal member 8, at the position of an interruption 13 of the connecting struts 11.

The trestle 12 has the shape of a tube which reaches to the top side of the longitudinal member 8 and which, under the longitudinal member 8, is bevelled on the back side.

The end of the trestle 12 situated between the base struts 10 is glued to the cores of these base struts with two flat side walls.

A glue is selected which is similar to the glue used for composing the longitudinal members 8.

Under the longitudinal member 8, the trestle 12 may possibly be widened somewhat to prevent the base struts 10 from shifting downwards with slightly protruding parts.

Right through the two base struts 10 and the trestle 12 may possibly be provided with a bolt 14 upon its end is screwed a nut 15. This bolt 14 is provided in a neutral place where there is no relative movement of the surfaces of the base strut 10 and the trestle 12 which are situated against one another, and where the forces on the base struts 10 are minimal.

This bolt 14 does not serve to absorb forces, but it helps to prevent a lateral shift of the trestle 12 in relation to the two base struts 10. Moreover, the bolt 14 keeps the trestle 12 and the base struts 10 together, such that they cannot move during the curing of the glue.

The trestle 12 can be made of steel or aluminum, but it is preferably also made of composite material, for example by moulding it under pressure and heat, by way of what is called compressing moulding or the hand lay-up method. The compressing moulding technique consists in putting the polymer and the reinforcement fibres or a mat of pre-impregnated fibres in a heated mould, and by subsequently pressing the mixture of polymer and reinforcement in the required shape under a large pressure of, for example, some 100 tons per m$^2$.

At the lower end of the trestle 12 is fixed a leaf spring 16, possibly by hinges. At a distance from the trestle 12, the bearing 6 is fixed on the leaf spring 16 by fasteners 17.

Between the suspension member 6 and a part of the trestle 12 situated under the longitudinal member 8 is provided a shock absorber 18, whereas bellows 19 are situated between the free end of the leaf spring 16 and the longitudinal member 8 which are connected to a compressed air source in a manner which is not represented in the figures.

Figure 6:
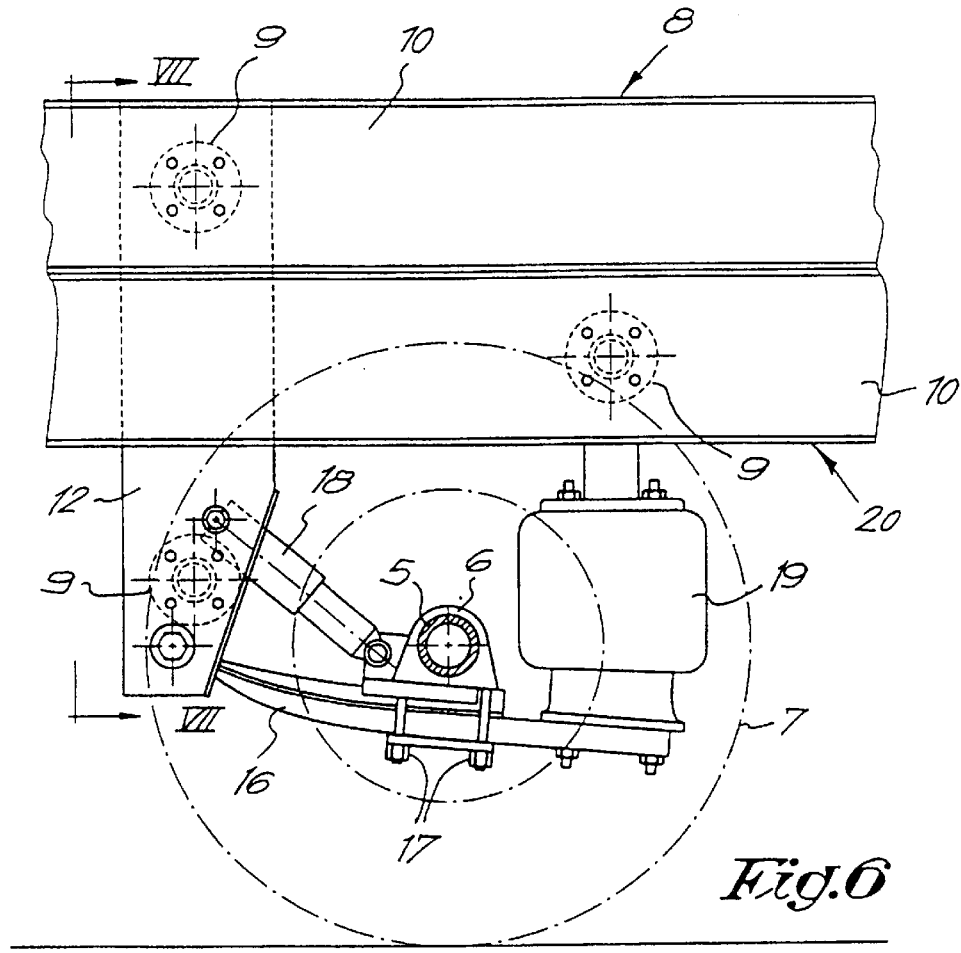
FIG. 6 shows a side view of a part of a trailer analogous to that in FIG. 2, but with reference to another embodiment thereof.
Figure 7:
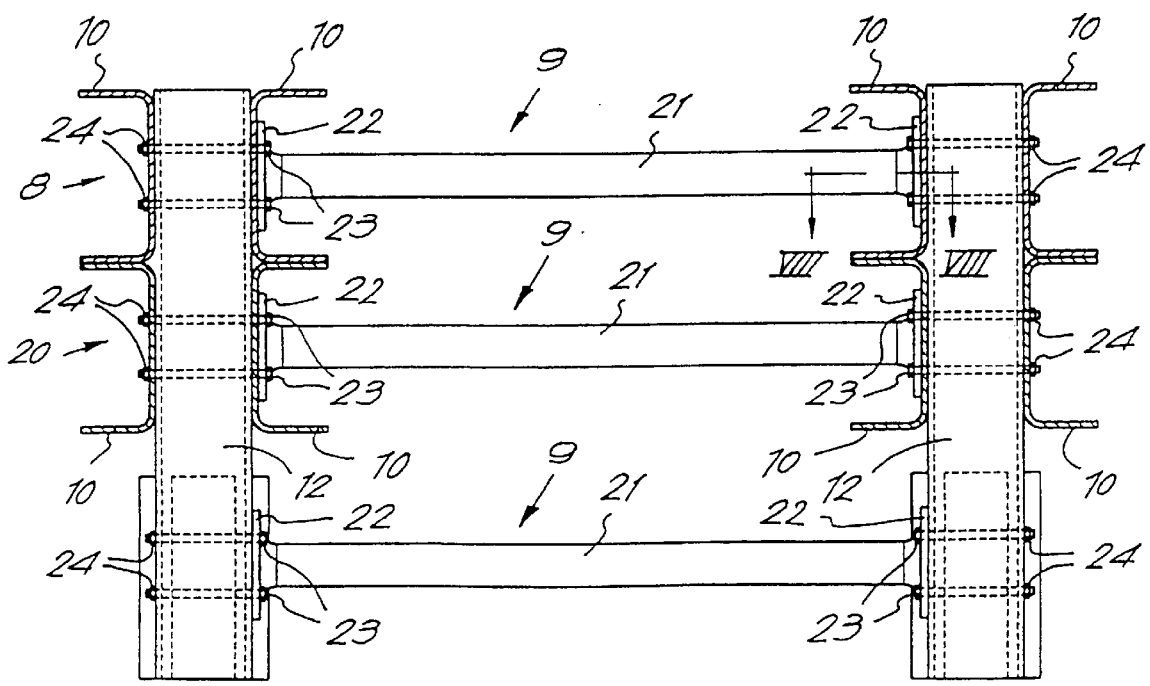
FIG. 7 shows a section according to line VII—VII in FIG. 6.

If necessary, the longitudinal members 8 can be reinforced at the bottom near the axles 5 by auxiliary longitudinal members 20, as is represented in FIGS. 6 to 8.

These auxiliary longitudinal members 20 have the same section and are manufactured in the same manner as the longitudinal members 8. Only their length is much shorter.

The longitudinal members 8 and 20 are situated right underneath one another. The trestles 12 which are fixed to the longitudinal members 8 extend between the two base struts 10 of the auxiliary longitudinal member 20 and are glued to these base struts 10 in the same manner as they are to the longitudinal members 8. The bellows 19 are erected between the leaf spring 16 and the auxiliary longitudinal member 20.

The cross members 9 each consist of a round, tubular body 12 and round flanges 22 on both ends as represented in FIGS. 5, 7 and 8. The tubular body 21 is made of composite material, in particular by pulwinding or filament winding.

Pulwinding is a variant of pultrusion, whereby one or several layers of reinforcement fibres are wound on a mandrel and are soaked with polymer prior to and/or after the application, after which the whole is pulled through an extrusion part, after which the polymer cures.

Filament winding is a method whereby reinforcement fibres or ribbons soaked with polymer are wound on a rotating mandrel or cylinder, after which the polymer cures.

The flanges 22 are made as separate from composite material, preferably by the above-mentioned compressing moulding technique, and they are glued to the ends of the body 21, preferably by a two-component glue such as epoxy. The connection of the flanges 22 to the body 21 is rounded on the side which is turned away from the end by a synthetic material such as polyester.

The cross member 9 are glued with their flanges 22 to the core of a base strut 10 of the two longitudinal members 8 and/or of the two auxiliary longitudinal members 20 by a flexible glue, for example a two-component glue.

In order to absorb shearing forces and to maintain the flanges 22 in place during the curing of the glue, it is possible to further fix each of the flanges 22 to the cores of the base struts 10 by four bolts 23 and respective nuts 24.

If a cross member 9 is provided between the longitudinal members 8 at the position of two trestles 12, the bolts 23 may replace the above-mentioned bolt 14.

Also between the part of the two trestles 12 situated opposite one another which protrude at the bottom may be provided a cross member 9 in the above-described manner, as is represented in FIGS. 6 and 7.

The obtained tubular construction of the composed longitudinal members 8 provides a particular torsional strength. Thanks to the composite material and the gluing of the struts 10 and 11, these members are particularly strong and light.

The cross members 9 do not only keep the two longitudinal members 8 in place, but also absorb the torques of the frame 3 in the longitudinal direction. The above-described cross members 9 are particularly fit for this.

The top side of the trestle 12 situated between the base struts 10 of a longitudinal member 8, makes it possible for this trestle 12 to be glued with two vertical side walls and on both sides to the two base struts 10, which results in a very large contact surface and prevents a load in one particular point on the longitudinal member 8.

All this allows for a significantly better connection of the trestle 12 to the longitudinal member 8 than a plate which is fixed at the end of the trestle 12 and which would be fixed to the bottom side of the longitudinal member 8 by glue, bolts or a combination thereof. Tests have proven that the latter mounting of the trestle 12 results in the connection being torn after a while.

Not only are the longitudinal members 8 very strong and light, but also the springy connection of the trestles 12 is particularly strong. Partly thanks to this strong connection, it has become possible to use composite material for the struts 10 and 11.

The above-mentioned cross members 9 need not necessarily be provided with flanges 22 at their ends.

Figure 9:
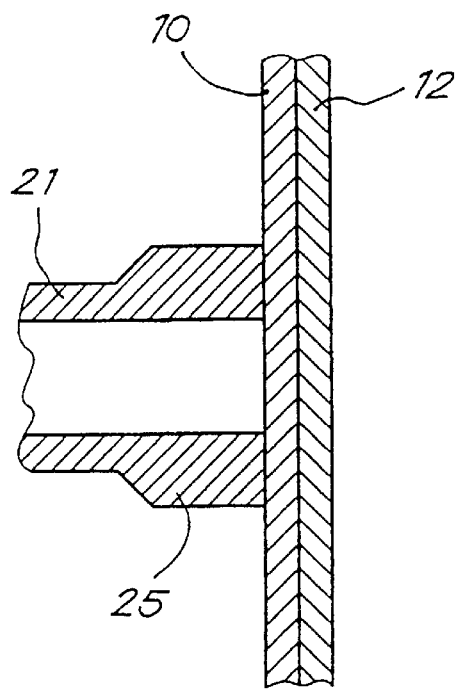
FIG. 9 shows a section analogous to that in FIG. 8, but with reference to another embodiment.

They can be made according to another embodiment as represented in FIG. 9, whereby their tubular body 21 is provided with a thickening 25 on both ends. This thickened end has a sufficiently large surface to be glued tightly to the longitudinal members 8, either with or without additional bolts.

According to this embodiment, the body 21 is obtained by pulwinding or filament winding.

Figure 10:
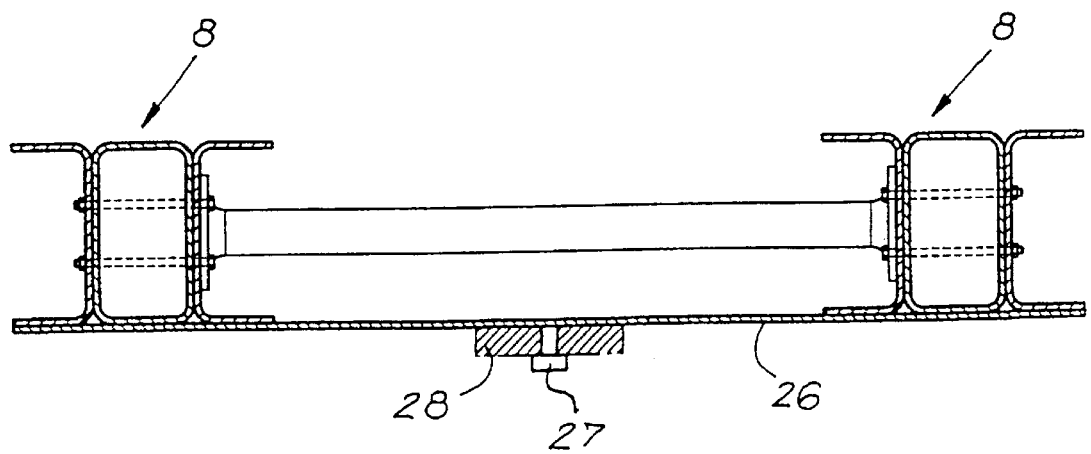
FIG. 10 shows a section according to line X—X in FIG. 1 to a larger scale.

At the front, the above-described trailer 2 may contain, as is represented in FIG. 10, a plate 26 made of composite material which is glued to the bottom side of the two longitudinal members 8 and which carries a king pin 27 at the bottom with which the trailer 2 can be connected to the pivoting platform 28 of the truck 1.

The present invention is by no means restricted to the above-described preferred embodiments, but covers all variations that might be implemented by using equivalent functional elements or devices that would be apparent to a person skilled in the art, or modifications that fall within the spirit and scope of the amended claims. springy connection of the trestles 12 is particularly strong. Partly thanks to this strong connection, it has become possible to use composite material for the struts 10 and 11.

The above-mentioned cross members 9 need not necessarily be provided with flanges 22 at their ends.

They can be made according to another embodiment as represented in FIG. 9, whereby their tubular body 21 is provided with a thickening 25 on both ends. This thickened end has a sufficiently large surface to be glued tightly to the longitudinal members 8, either with or without additional bolts.

According to this embodiment, the body 21 is obtained by pulwinding or filament winding.

At the front, the above-described trailer 2 may contain, as is represented in FIG. 10, a plate 26 made of composite material which is glued to the bottom side of the two longitudinal members 8 and which carries a king pin 27 at the bottom with which the trailer 2 can be connected to the pivoting platform 28 of the truck 1.

The present invention is by no means restricted to the above-described preferred embodiments, but covers all variations that might be implemented by using equivalent functional elements or devices that would be apparent to a person skilled in the art, or modifications that fall within the spirit and scope of the amended claims.

What is claimed is:

1. A frame for a vehicle, comprising:

at least two longitudinal members (8) composed of composite material;

at least two suspension members (6);

at least one axle (5) supported by the suspension members (6);

at least two connection devices (12, 16–19), each one of the connecting devices (12, 16–19) connecting one of the suspension members (6) to one of the two longitudinal members (8);

the connection device (12, 16–19) including a connecting trestle (12), the connecting trestle (12) having upper and lower ends and at least two standing sidewalls;

each of the longitudinal members (8) including receiving surfaces;

the upper end of the trestle (12) positioned at the receiving surfaces of each of the two longitudinal members (8); and the at least two standing sidewalls of the upper end of the trestle (12) glued to the receiving surfaces of each of the longitudinal members (8).

2. The frame as recited in claim 1, wherein the connection device (12, 16–19) includes a leaf spring (16) having at least two ends that is connected at one of the ends to the lower end of the trestle (12), bellows (19) arranged between the other one of the ends of the leaf spring (16) and each of the two longitudinal members (8), and a shock absorber (18) arranged between one of the suspension members (6) and the trestle (12).

3. The frame as recited in claim 1, wherein each of the longitudinal members (8) includes two base struts (10), each of the two longitudinal members (8) includes two base struts (10), the upper end of the trestle (12) being inserted between said base struts (10) and glued to the two base struts (10).

4. The frame as recited in claim 3, wherein each of the longitudinal members (8) includes two base struts (10) and at least two smaller connecting struts (11), the upper end of the trestle (12) is inserted between the two base struts (10) at a position of an interruption (13) of one or more connecting struts (11).

5. The frame as recited in claim 1, wherein the trestle (12) is composed of composite material.

6. The frame as recited in claim 1, further comprising at least two auxiliary longitudinal members (20) composed of composite material, each of the auxiliary longitudinal members (20) extends under each of the longitudinal members (8), the auxiliary longitudinal members (20) positionable such that they may be either in or out of contact with the sidewalls of the trestles (12) that are glued to the longitudinal members (8), when the sidewalls of the trestles (12) are in contact with the auxiliary longitudinal members (20) the sidewalls of the trestles (12) are also glued to the auxiliary longitudinal members (20).

7. The frame as recited in claim 1, wherein the longitudinal members (8) are pultruded members.

8. A frame for a vehicle, comprising:

at least two longitudinal members (8) composed of composite material;

at least two suspension members (6);

at least one axle (5) supported by suspension members (6);

a connection device (12, 16–19) connecting each of the suspension members (6) to each of the longitudinal members (8);

each of the longitudinal members (8) includes two base struts (10) and at least two smaller connecting struts (11), each of the base struts (10) having a U-shaped section, the, U-shaped section of each of the base struts (10) including a core section;

each of the longitudinal members (8) are formed by gluing each of the at least two smaller connecting struts (11) to the core sections of the two base struts (10).

9. The frame as recited in claim 8, wherein each of the connecting struts (11) having a U-shaped section, the U-shaped section of each of the connecting struts (11) including legs, and the legs are glued to the core sections of the base struts (10).

10. A frame for a vehicle, comprising:

at least two longitudinal members (8) composed of composite material;

at least one axle (5) supported by suspension members (6);

a connection device (12, 16–19) connecting each of the suspension members (6) to each of the longitudinal members (8);

at least one cross member (9) made of composite material, the cross member (9) having two ends and a tubular body (21) composed of a material made by filament winding; and each of the ends of the cross member (9) glued to one of the longitudinal members (8).

11. The frame as recited in claim 10, wherein the cross member (9) includes two flanges (22) that are glued to the ends of the tubular body (21), the cross member (9) manufactured at a high temperature and pressure.

12. The frame as recited in claim 11, wherein the ends of the cross member (9), including the flanges (22) or a thickening (25), are fixed to the longitudinal members (8) by nuts (24) and bolts (23).

13. The frame as recited in claim 10, wherein the tubular body (21) includes a tubular wall, the tubular wall forms a thickening (25) at the ends of the cross member (9), the ends of the cross member (9) including the thickening (25) are glued to the longitudinal members (8).

14. A frame for a vehicle, comprising:
at least two longitudinal members (8) composed of composite material;
at least two suspension members (6);
at least one axle (5) supported by suspension members (6);
a connection device (12, 16–19) connecting each of the suspension members (6) to each of the two longitudinal members (8);
a front portion having a plate (26) composed of composite material, said plate being glued to the two longitudinal members (8) and including a bottom; and
a king pin (27) attached at the bottom of the plate (26) and configured to fasten the frame to a trailer.

* * * * *